(12) United States Patent
Hattass

(10) Patent No.: US 8,711,459 B2
(45) Date of Patent: Apr. 29, 2014

(54) MICROMECHANICAL COMPONENT, DEVICE FOR BEAM DEFLECTION OF MONOCHROMATIC LIGHT, AND SPECTROMETER

(75) Inventor: Mirko Hattass, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 12/925,675

(22) Filed: Oct. 26, 2010

(65) Prior Publication Data
US 2011/0134502 A1 Jun. 9, 2011

(30) Foreign Application Priority Data
Nov. 4, 2009 (DE) .......................... 10 2009 046 388

(51) Int. Cl.
*G02B 26/08* (2006.01)
(52) U.S. Cl.
USPC ...................................... 359/221.2
(58) Field of Classification Search
USPC .............. 359/563, 569, 573, 227, 230, 221.2, 359/198.1
See application file for complete search history.

(56) References Cited

U.S. PATENT DOCUMENTS

| | | | |
|---|---|---|---|
| 6,643,065 B1 * | 11/2003 | Silberman | 359/573 |
| 7,339,738 B1 * | 3/2008 | Carr et al. | 359/569 |
| 2010/0194008 A1 * | 8/2010 | Gunthner | 267/158 |

FOREIGN PATENT DOCUMENTS

DE 10 2007 050 002 4/2009

OTHER PUBLICATIONS

Tormen M. et al., "Deformable MEMS grating for wide tunability and high operating speed," SPIE 6114 61140C, 2006.*
Yu, Yi-Ting et al., "Developmental of a micromechanical pitch-tunable grating with reflective/transmissive dual working modes," J. Micromech. Microeng. 20 065002, May 11, 2010.*

* cited by examiner

*Primary Examiner* — Euncha Cherry
(74) *Attorney, Agent, or Firm* — Kenyon & Kenyon LLP

(57) ABSTRACT

A micromechanical component includes a micromechanical unidimensional optical lattice structure for diffracting an incident light beam, and a linear drive connected to the lattice structure for compressing and/or stretching the lattice structure in the plane of the lattice structure. The lattice structure is of elastic design with regard to a change of shape resulting from the compressing and/or stretching. The micromechanical component may be incorporated in a device for beam deflection of monochromatic light or in a spectrometer.

18 Claims, 3 Drawing Sheets

MICROMECHANICAL COMPONENT, DEVICE FOR BEAM DEFLECTION OF MONOCHROMATIC LIGHT, AND SPECTROMETER

BACKGROUND OF THE INVENTION

1. Field of the Invention

The present invention relates to a micromechanical component, a device for beam deflection of monochromatic light, and a spectrometer.

2. Description of Related Art

Starting from the progressive miniaturization of electrical systems, in particular on the basis of semiconductor materials, micromechanical components have also been developed from semiconductor materials, which are widely used today.

Published German patent application document DE 10 2007 050 002 A1 discloses a micromechanical sensor or actuator component with optical function, which has a substrate and an optical element that is displaceable from the substrate, the surface of the substrate and of the displaceable element being sealed using a transparent cover. The optical main axis of the cover is not perpendicular to the surface of the substrate.

Micromechanical components of this type having an optical function are employed, for example, as micromirrors for deflecting light beams in optical networks. The incident light beam is directed in the desired direction by tilting a reflective surface.

BRIEF SUMMARY OF THE INVENTION

The present invention provides a micromechanical component having a micromechanical unidimensional optical lattice structure for diffracting an incident light beam and a linear drive connected to the lattice structure for compressing and/or stretching the lattice structure in the plane of the lattice structure, the lattice structure being of elastic design with regard to a change of shape resulting from the compressing and/or stretching. The present invention also provides a device for beam deflection of monochromatic light having a micromechanical component according to the present invention, as well as a spectrometer having a micromechanical component according to the present invention.

According to the present invention, a micromirror is not used for deflecting an incident light beam, but rather a micromechanical unidimensional lattice structure at which an incident light beam is diffracted. The lattice structure may be compressed and/or stretched in the plane of the lattice structure by a linear drive connected to the lattice structure. In this way, the lattice structure becomes tunable; that is, it becomes variable with regard to its reflection wavelength. The linear drive can be of relatively simple design in this case in comparison to the drive systems used for micromirrors, in which frequently a plurality of axes must be operated, sometimes even resonantly.

According to one example embodiment of the present invention, the micromechanical component has a substrate, and a functional layer situated parallel to the substrate and spaced at a distance from it in which the lattice structure, the linear drive, and a suspension structure are formed.

The linear drive may have only one drive unit, via which one side of the lattice structure is connected to the suspension structure. In that case, the opposite side of the lattice structure is fixedly connected to the suspension structure. Alternatively to the above, the linear drive may also have two drive units, which connect the lattice structure to the suspension structure on both sides.

According to one example embodiment of the present invention, the drive unit is implemented as an electrostatic linear drive, in particular an electrostatic comb drive. Using electrostatic linear drives, relatively large forces can be generated with a relatively simple structure. In addition to electrostatic drives, however, the use of piezoelectric, thermal, or magnetic drives is also possible.

According to another example embodiment of the present invention, at least one movable electrode of the drive unit, in particular a movable comb electrode, is connected to the lattice structure, and is connected via at least one mechanically deformable elastic element, for example, a spring element, to the suspension structure; and at least one rigid electrode of the drive element, in particular a rigid comb electrode, is connected to the suspension structure. A system of this type results in a particularly simple overall structure of the micromechanical component.

Another example embodiment of the present invention provides that the lattice structure be formed of serpentine-shaped structural elements, in particular of essentially parallel, bar-type structural elements that are connected on alternate sides. Elastic compression and/or elastic extension may be implemented very easily with a lattice structure of a design of this type. The compressing and/or stretching of the lattice structure results in a change in the spacing of the bar-type structural elements, and hence in a change in the lattice parameter—often also referred to as the lattice constant. This in turn results in a change of the reflection wavelength of the optical lattice, so that the lattice is tunable in this way.

Advantageously, the lattice parameter or lattice constant of the lattice structure lies within the range of the wavelength of the light beam that is to be diffracted. This ensures the most precise diffraction possible, and thus an exact deflection of the beam.

Along with the simple layout of the structure of the micromechanical component according to the present invention, it is also distinguished by very simple addressability, enabling both static and resonant operation. In the case of resonantly operated components, energy is fed to the component to maintain the oscillation of the component by applying an appropriate time-dependent voltage of a certain frequency at periodic intervals.

Since only monochromatic light is utilized for many applications, the output angle of an incident light beam in relation to the angle of incidence may be controlled directly by the micromechanical component according to the present invention through the change in the lattice parameter. The micromechanical component according to the present invention is thus suited for use in a device for beam deflection of monochromatic light. The higher-order light beams that are produced during the diffraction may be filtered out with the aid of a diaphragm device.

However, the micromechanical component according to the present invention may also be used in a spectrometer for analyzing broadband light. In this case, the wavelength range may be selected, for example, with the aid of a slit diaphragm. When using a spectrometer, higher-order diffracted light beams may also be filtered out, for example, with the aid of a diaphragm device.

DETAILED DESCRIPTION OF THE INVENTION

Figure 1:
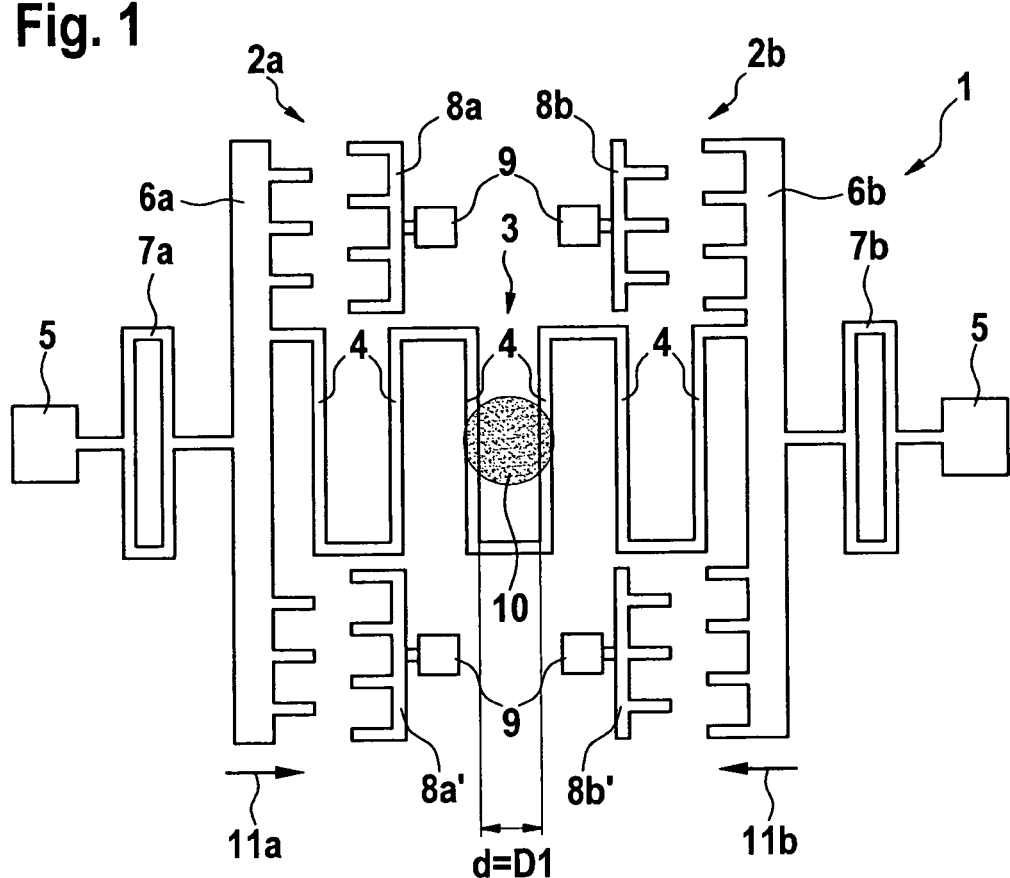
FIG. 1 shows a schematic top view of a micromechanical component according to the present invention, having a non-deflected lattice structure.

In the figures, identical or functionally equivalent components are identified with the same reference numerals.

FIG. 1 shows a micromechanical component 1 according to the present invention in an operating state in which a linear drive 2, which is depicted by way of example as an electrostatic comb drive, is inactive and thus a lattice structure 3 is not deflected, i.e., is neither compressed nor extended. Lattice structure 3 is depicted for example as serpentine-shaped, and is made of structural elements in the form of parallel bar-type structural elements 4 that are connected on alternate sides. However, lattice structure 3 may be implemented in any manner desired, departing from the depicted form of construction, as long as there is assurance on the one hand that it works as an optical lattice and on the other hand that it is compressible and/or stretchable with the aid of a linear drive. In addition, lattice structure 3 must be of elastic design with regard to the change in shape caused by the compressing and/or stretching, so that it is able to return to its original shape after a deflection.

In the depicted exemplary embodiment, linear drive 2 includes two drive units 2a and 2b, which connect lattice structure 3 on both sides to a suspension structure 5. The drive units are depicted by way of example as electrostatic comb drives. Besides electrostatic comb drives, however, any other suitable electrostatic drive principles, or piezoelectric, thermal or magnetic drive systems, may be used to compress and/or stretch lattice structure 3. Drive units 2a and 2b each have a movable comb electrode 6a and 6b, respectively, which is connected to lattice structure 3, and via a mechanically deformable elastic element 7a or 7b to suspension structure 5. As an example, the mechanically deformable elastic element is depicted as a spring element in the form of a double-U spring, but it may also be designed in any other way desired. In addition, drive units 2a and 2b each have two rigid comb electrodes 8a and 8a', 8b and 8b', respectively, which are situated opposite movable comb electrodes 6a and 6b. Rigid comb electrodes 8a, 8a', 8b and 8b' are fixedly connected via first suspension elements 9 to a substrate (see FIG. 3) which lies beneath the functional layer depicted in FIG. 1.

The distance d=D1 between bar-type structural elements 4 represents the lattice parameter or lattice constant of lattice structure 3. This distance d, and thus the lattice parameter of lattice structure 3, lies advantageously within the range of the wavelength of a light beam 10 that is to be diffracted. When the electrostatic comb drive is activated, that is, when an appropriate electrical voltage is applied to the comb electrodes, movable comb electrodes 6a and 6b are attracted by rigid comb electrodes 8a and 8a', 8b and 8b', respectively, so that movable comb electrodes 6a and 6b move toward rigid comb electrodes 8a and 8a', 8b and 8b', respectively. This movement is indicated in FIG. 1 by directional arrows 11a and 11b. At the same time, this movement of comb electrodes 6a and 6b results in a compressing of lattice structure 3 in the plane of lattice structure 3.

Figure 2:
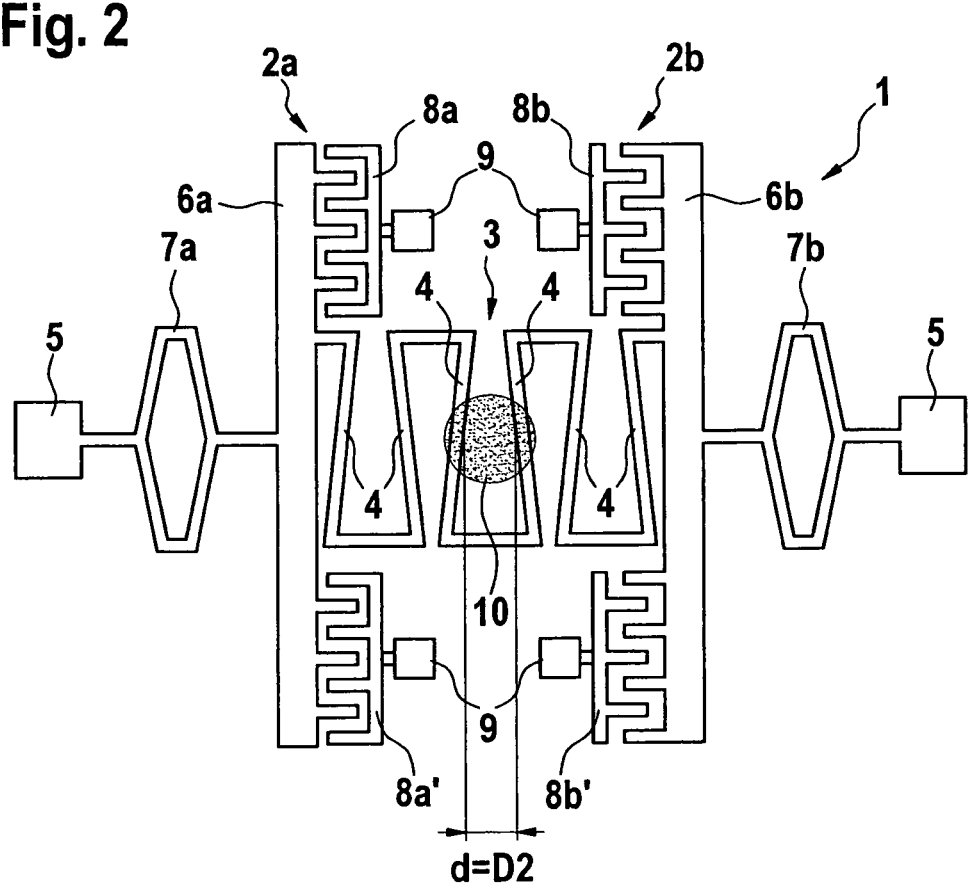
FIG. 2 shows a schematic top view of the micromechanical component according to FIG. 1, having a deflected lattice structure.

FIG. 2 shows micromechanical component 1 according to FIG. 1 with linear drive 2 activated and thus with lattice structure 3 compressed. The force exerted on lattice structure 3 by linear drive 2 causes lattice structure 3 to be compressed in such a way that bar-type structural elements 4 are no longer parallel, but have a certain angular misalignment. As a result of this angular misalignment, the distance d between bar-type structural elements 4 changes from a value D1 in the original state (see FIG. 1) to a value D2, where D2<D1. But since the distance between the bar-type structural elements simultaneously represents the lattice parameter of lattice structure 3, the compressing of lattice structure 3 has also caused the deflection characteristic of lattice structure 3 to change. To compensate for the compressing of lattice structure 3, mechanically deformable elastic elements 7a and 7b are correspondingly stretched.

Although FIG. 2 shows only the state of the micromechanical component at the maximum deflection of linear drive 2, and thus of lattice structure 3, all intermediate positions are, of course, also implementable by controlling linear drive 2 appropriately, so that a completely tunable lattice structure 3 is produced.

In the depicted exemplary embodiment, linear drive 2 includes two drive units 2a and 2b, which are situated on the left and right sides of lattice structure 3. Alternatively, there may also be only one drive unit provided, which connects lattice structure 3 to suspension structure 5 on only one side. In that case the opposite side of lattice structure 3 is fixedly connected to suspension structure 5.

Figure 3:
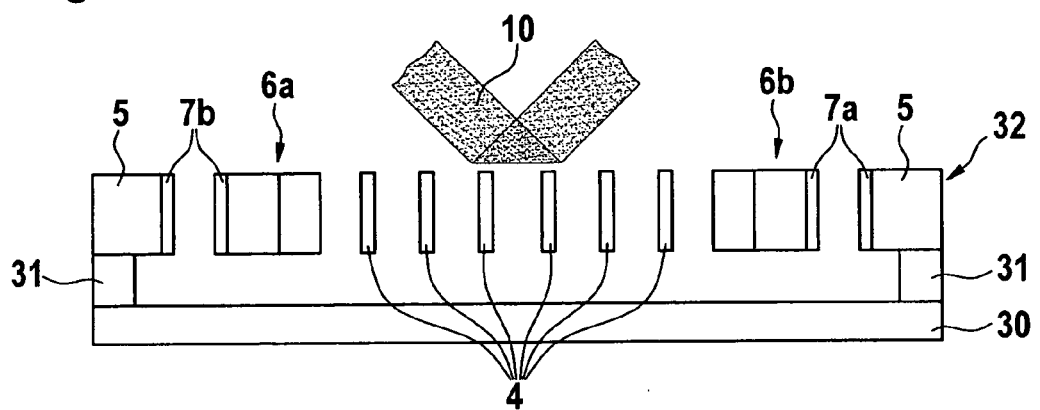
FIG. 3 shows a schematic side view of a micromechanical component according to the present invention.

FIG. 3 shows a schematic side view of a micromechanical component according to the present invention, in the non-deflected state according to FIG. 1. In addition to the components already described, a substrate 30 and second suspension elements 31 are also recognizable here. Second suspension elements 31 ensure, as do first suspension elements 9 also, that a functional layer 32, in which lattice structure 3, linear drive 2, and suspension structure 5 are formed, is spaced at a distance from substrate 30. Suspension elements 9 and 31, together with suspension structure 5, naturally also serve to suspend the active structures of functional layer 32, i.e., lattice structure 3, comb electrodes 6a, 6b, 8a, 8a', 8b and 8b', and mechanically deformable elastic elements 7a and 7b. Furthermore, electrical contacting of the respective drive electrodes may also be accomplished through suspension elements 9 and/or 31.

The depicted example of a linear drive 2 represents a preferred embodiment. Alternatively, however, any other drive systems may also be used. In particular, other electrostatic drives may also be used, or the arrangement and number of electrodes may also be varied depending on the application.

The structure of the micromechanical component according to the present invention allows both static and resonant operation.

Figure 4:
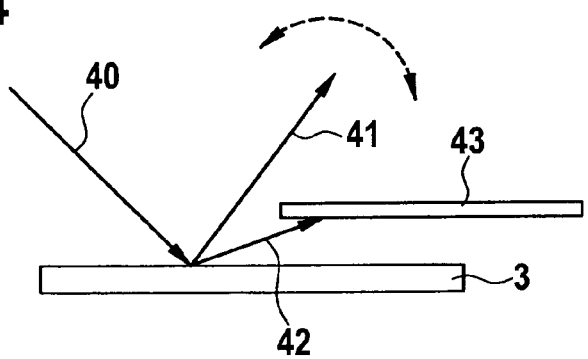
FIG. 4 shows a schematic depiction of the functioning of a micromechanical component according to the present invention used in a device for beam deflection of monochromatic light.

If monochromatic light radiation 40 strikes lattice structure 3, diffraction of the light beam occurs (FIG. 4). The following relationship applies to perpendicular light incidence:

$$n \times \lambda = d \times \sin(\alpha)$$

Here n designates the order of the diffraction maxima, λ the wavelength of the incident light, d the distance between the bar-type structural elements 4, and α the angle of deflection. For d=2 μm and λ=500 nm this produces an exit angle of approximately 14.5° of the first-order diffraction maxima 41. By cutting the lattice constant in half from 2 μm to 1 μm, a deflection angle of 30° is readily achieved. Hence, when irradiating with monochromatic light, the deflection angle may be influenced deliberately by changing the distance between bar-type structural elements 4 and thus changing the lattice parameter. The micromechanical component according to the present invention is thus suited for use in devices for beam deflection of monochromatic light. The higher-order diffraction maxima 42 may be filtered out, for example, by an appropriate diaphragm device 43.

Figure 5:
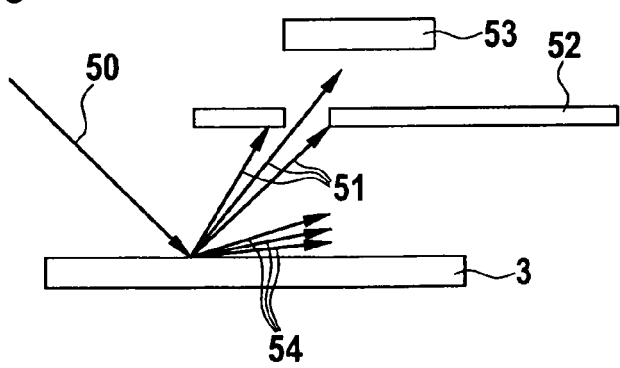
FIG. 5 shows a schematic depiction of the functioning of a micromechanical component according to the present invention used in a spectrometer.

Alternatively, the micromechanical component according to the present invention may also be used in a spectrometer for analyzing incident broadband light radiation 50 (FIG. 5). In this case, emerging light beam 51 (first-order diffraction maxima) may be passed, for example, through a slit diaphragm 52, which selects a wavelength calculated from the above equation depending on the setting of the lattice parameter. The emerging radiation may then be verified using an appropriate detector 53, for example, in the form of a photodiode. The higher-order diffraction maxima 54 may also be filtered out here, for example, by an appropriate diaphragm device (not shown).

The micromechanical component according to the present invention may also be used for separating (demultiplexing) superimposed radiation of discrete wavelengths. To that end, an appropriate detector, for example, in the form of a photodiode, is provided, for example, for each of the relevant wavelengths. The selection of the wavelengths may also be implemented in this case using a slit diaphragm having an appropriate number of slits.

What is claimed is:

1. A micromechanical component, comprising:
   a substrate;
   a functional layer situated parallel to the substrate and at a distance from the substrate;
   a micromechanical unidimensional optical lattice structure configured to diffract an incident light beam; and
   a linear drive including a first drive unit that is connected to the optical lattice structure and includes a first component and a second component that are movable relative to each other;
   wherein:
   the first component is located between the two parallel planes;
   the linear drive is configured to provide at least one of compression and stretching of the optical lattice structure in a plane of the optical lattice structure;
   the optical lattice structure is configured to be elastic with regard to a change of shape resulting from the at least one of compression and stretching; and
   the optical lattice structure, the linear drive, and a suspension structure are formed on the functional layer.

2. The micromechanical component as recited in claim 1, wherein the first component and the second component of the linear drive are located opposite each other.

3. The micromechanical component as recited in claim 1, wherein one side of the optical lattice structure is connected to the suspension structure by the first drive unit, and an opposite side of the optical lattice structure is fixedly connected to the suspension structure.

4. The micromechanical component as recited in claim 1, wherein:
   the linear drive includes a second drive unit;
   the first drive unit connects a first side of the optical lattice structure to the suspension structure; and
   the second drive unit connects a second side of the optical lattice structure to the suspension structure.

5. The micromechanical component as recited in claim 3, wherein the first drive unit is an electrostatic comb drive, the first component is at least one movable comb electrode, and the second component is at least one rigid comb electrode.

6. The micromechanical component as recited in claim 5, wherein the at least one movable comb electrode of the first drive unit is connected to the optical lattice structure and to the suspension structure by at least one mechanically deformable elastic element, and wherein the at least one rigid comb electrode of the first drive unit is connected to at least one first suspension element.

7. The micromechanical component as recited in claim 6, wherein the mechanically deformable elastic element is a spring element.

8. The micromechanical component as recited in claim 3, wherein the optical lattice structure is formed of serpentine-shaped structural elements including parallel, bar-type structural elements connected on alternate sides.

9. The micromechanical component as recited in claim 8, wherein a lattice parameter of the optical lattice structure lies within a range of the wavelength of the incident light beam to be diffracted.

10. The micromechanical component as recited in claim 9, wherein the micromechanical component is statically operated.

11. The micromechanical component as recited in claim 9, wherein the micromechanical component is resonantly operated.

12. The micromechanical component as recited in claim 9, wherein the micromechanical component is a component of a device for beam deflection of monochromatic light.

13. The micromechanical component as recited in claim 12, wherein higher-order diffracted light beams are filtered out with the aid of a diaphragm device.

14. The micromechanical component as recited in claim 9, wherein the micromechanical component is a component of a spectrometer.

15. The micromechanical component as recited in claim 14, wherein at least one of: (a) higher-order diffracted light beams are filtered out with the aid of a diaphragm device; and (b) wavelength ranges are selected with the aid of a slit diaphragm.

16. The micromechanical component as recited in claim 6, wherein the at least one rigid comb electrode is configured to attract and repel the at least one movable comb electrode to, respectively, compress and expand the optical lattice structure.

17. The micromechanical component as recited in claim 1, wherein the micromechanical unidimensional optical lattice structure includes a first end within a first plane and a second end within a second plane that is parallel to the first plane.

18. The micromechanical component as recited in claim 17, wherein the first component and the second component of the linear drive are located opposite each other.

* * * * *